United States Patent [19]

Lee et al.

[11] 4,374,651

[45] Feb. 22, 1983

[54] COMPOSITE OF METAL-BONDED CUBIC BORON NITRIDE AND A SUBSTRATE AND PROCESS OF PREPARATION

[75] Inventors: Minyoung Lee, Schenectady; Lawrence E. Szala, Scotia, both of N.Y.

[73] Assignee: General Electric Company, Schenectady, N.Y.

[21] Appl. No.: 305,865

[22] Filed: Sep. 28, 1981

[51] Int. Cl.³ .............................................. B24D 3/02
[52] U.S. Cl. ......................................... 51/309; 51/307
[58] Field of Search .................................. 51/307, 309

[56] References Cited

U.S. PATENT DOCUMENTS

| | | | |
|---|---|---|---|
| 3,743,489 | 7/1973 | Wentorf et al. | 51/307 |
| 3,852,078 | 12/1974 | Wakatsuki et al. | 51/309 |
| 3,982,911 | 9/1976 | Lee | 51/307 |
| 3,982,911 | 9/1976 | Lee | 51/307 |
| 4,171,339 | 10/1979 | Lee et al. | 51/307 |
| 4,173,614 | 11/1979 | Lee et al. | 51/307 |
| 4,234,661 | 11/1980 | Lee et al. | 51/309 |
| 4,241,135 | 12/1980 | Lee et al. | 51/307 |
| 4,242,106 | 12/1980 | Morelock | 51/307 |
| 4,311,490 | 1/1982 | Bovenkerk | 51/307 |

OTHER PUBLICATIONS

"Aluminum-Bonded Titanium Carbide Cermets", by O. R. Bergmann, Ceramic Bulletin, vol. 45, No. 7 (1966), pp. 639-642.

"Préparation et propriétés des cermets $TiB_2$–NiAl", by D. Broussaud et al., High Temperatures–High Pressures, 1974, vol. 6, pp. 455-461.

Primary Examiner—Donald E. Czaja
Assistant Examiner—W. Thompson
Attorney, Agent, or Firm—Leo I. MaLossi; James C. Davis, Jr.; James Magee, Jr.

[57] ABSTRACT

A process for simultaneously (1) cementing particles of cubic boron nitride (CBN) together, (2) bonding particles of ceramic together to form a substrate, or support layer, for the cemented CBN particles and bonding the cemented CBN particles to the substrate is described. Substrates consisting essentially of compatible combinations of ceramic particles and an aluminum-base bonding medium are disclosed.

21 Claims, 3 Drawing Figures

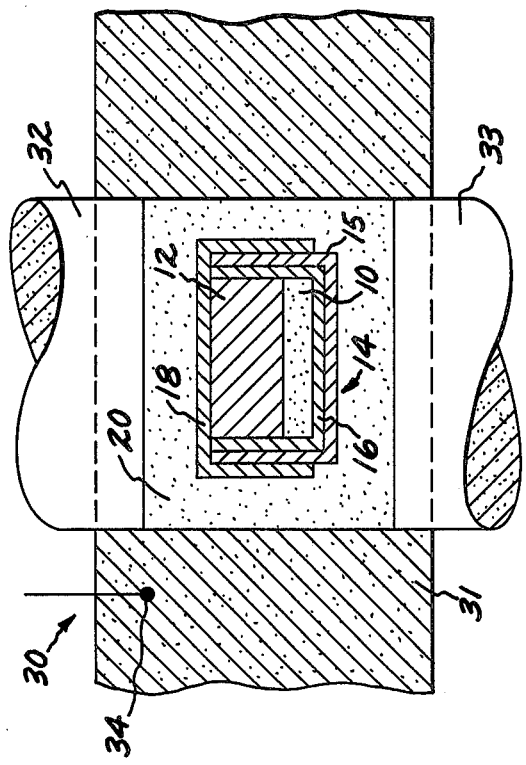
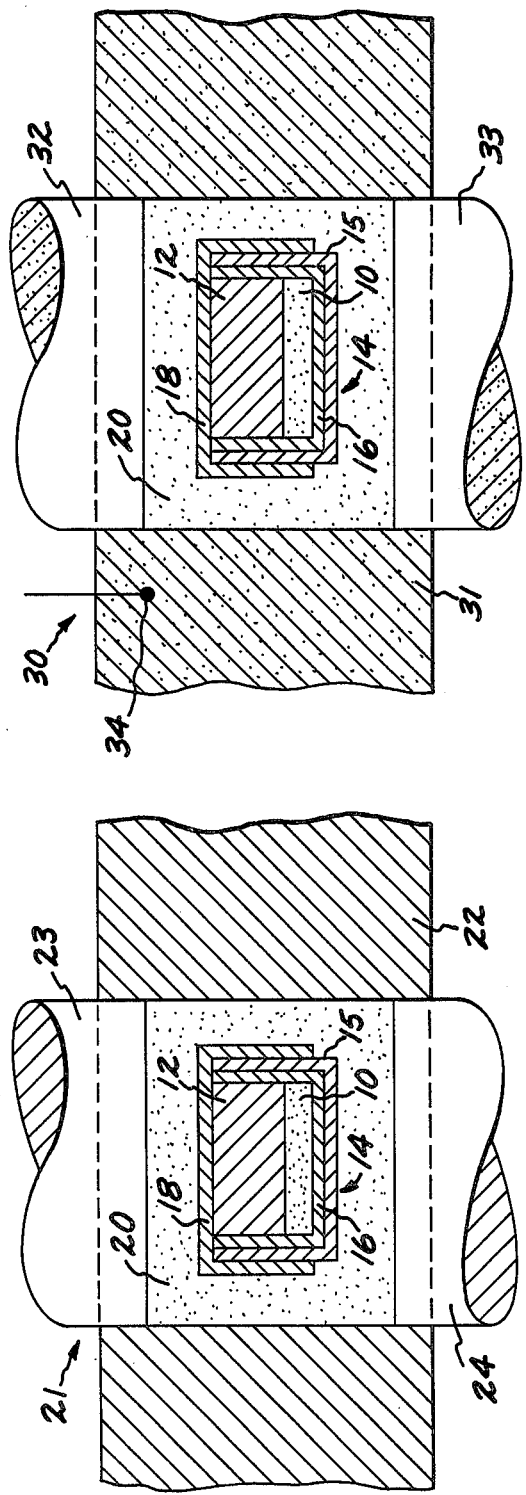
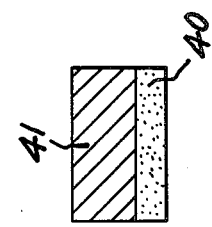

COMPOSITE OF METAL-BONDED CUBIC BORON NITRIDE AND A SUBSTRATE AND PROCESS OF PREPARATION

BACKGROUND OF THE INVENTION

This invention relates to the production of an article comprising cubic boron nitride (CBN) particles cemented to each other and bonded to a support layer, or substrate. Such composite articles find utility as wire drawing dies, tool inserts, abrasive bodies and wear surfaces. The preparation of the substrate alone for use as a wear surface is also contemplated.

High temperature, ultra high pressure preparation of tool inserts made of CBN crystals bonded to each other and bonded to and supported on a sintered carbide mass is described in U.S. Pat. No. 3,743,489—Wentorf et al. In the Wentorf et al. patent, particular aluminum alloys are employed as the bonding medium for the CBN crystals, not the substrate. The preparation of a metal-bonded CBN composite body containing greater than 70 percent by volume CBN and prepared at pressures at which CBN is metastable is disclosed in U.S. Pat. No. 3,982,911—Lee. The method described in the Lee patent requires placement of bonding material (i.e. certain aluminum alloys) on the side of the CBN particulates opposite from the substrate layer, an arrangement which presents a limitation on the geometry of the final composite structure. For example, it is very difficult to prepare a wire drawing die by the methods in the Lee patent.

The aforementioned restriction on bonding material placement has since been removed by the development of the process described in U.S. patent application Ser. No. 217,271—Lee et al., filed Dec. 17, 1980 and assigned to the assignee of the instant invention. The product produced by the Lee et al. invention comprises a cemented diamond mass bonded to a body of silicon-silicon carbide composite material. The silicon-silicon carbide composite initially serves as a source of silicon for the bonding, or cementing, of the diamonds and subsequently provides for the structural stability of the article itself as its substrate. The above-mentioned patents and application are incorporated by reference.

DESCRIPTION OF THE INVENTION

In accordance with the inventive concept disclosed herein, an integrated article comprising a mass of cemented CBN particles bonded to a hard strong substrate is produced by a process in which a quantity of multi-component material comprising a ceramic and an aluminum-atom yielding medium functions as the source of aluminum-base bonding material for both the CBN particles and the ceramic. Thus, aluminum-base material squeezed out of the multi-component material by subjecting the system (i.e. CBN and multi-component material) to sufficient pressure while it is heated significantly above the melting point of aluminum enters the mass of CBN particles to provide the cementing medium for the CBN particles and the aluminum-base material remaining serves as the bonding medium for the ceramic with the cemented CBN mass being affixed to the ceramic/aluminum-base substrate at the same time.

The process aspect of this invention is conducted by providing a quantity of CBN powder adjacent to the multi-component material (i.e. substrate precursor) in a stabilized geometry in a suitable container and subjecting this stabilized geometry to the simultaneous application of a pressure of at least about two thousand pounds per square inch and heat to a temperature above about 1200° C. in an inert atmosphere. While the melting point of aluminum is considerably below 1200° C., experimentation has shown that this much higher operating temperature is necessary in order that the proper wetting angle between the molten aluminum (or molten aluminum alloy) and the CBN surfaces can be secured. Conditioning of the aluminum-base bonding material in this way to properly wet CBN surfaces is a prerequisite to obtaining suitable bonding between the crystals and between the crystals so bonded and the substrate.

The series of functions to be performed by the aluminum dictates that a certain minimum aluminum atom content be present in the multi-component material at the initiation of the process. Thus, once a determination has been made of the size of the composite structure to be produced, i.e. the volume of the substrate plus the volume of the abrasive layer, the overall initial content of aluminum atom-yielding medium should be equal to at least about 30 percent of the volume of the composite structure to be prepared. The aluminum atom-yielding medium may be present other than as pure aluminum, i.e. as an alloy, providing there is at least 85 percent by weight of aluminum atoms in the alloy and the aluminum alloy is one which, when molten, will wet CBN and is compatible with ceramic content of the multi-component material. An amount of aluminum atom-yielding medium of as much as about 60 volume percent of the completed composite structure may be used recognizing that of this quantity only from about 30 to 35 percent of the volume of the completed abrasive layer will be occupied by the aluminum-base bonding medium. Too much aluminum in the substrate may result in a reduction of desirable properties for certain uses. Thus, in the case of a tool insert the content of aluminum-base bonding medium in the substrate should not exceed about 40 volume percent; in the case of a bearing construction it is anticipated that as much as 50 volume percent can be tolerated. As a practical matter, high volume percent contents (e.g. 60 v/o) of aluminum atom-yielding medium would be used, when it is contemplated that significant loss of the medium will occur during conduct of the process.

In the preferred embodiment, the multi-component material consists of a ceramic powder and a source of aluminum atoms. The ceramic powder should be compatible with the aluminum source, pure or alloyed, such that any chemical reaction occurring therebetween under the operating conditions of the process will, at most, be slow enough such that the ceramic particles will survive the process intact or suffer very minor reduction in volume.

Upon completion of the process for making the composite body, it will consist of a hard, relatively strong substrate to which is bonded a mass of cemented CBN particles. The substrate itself, will consist of ceramic particles cemented together with aluminum or with aluminum plus an aluminum intermetallic, depending upon the initial source of the aluminum. The aluminum content of the substrate may contain dissolved material derived from the ceramic or, in the event an aluminum alloy is employed, from alloy constituents.

Objects and the nature and advantages of the instant invention will be apparent to those skilled in the art from the description set forth herein and the accompanying drawings.

BRIEF DESCRIPTION OF THE DRAWINGS

The present invention will be readily and clearly understood by those skilled in the art upon reviewing the accompanying drawings in which:

FIG. 1 represents a vertical sectional view of a suitable containment of constituents to which substantially isostatic pressure is applied prior to forming a composite structure according to the inventive concept disclosed herein;

FIG. 2 is a view similar to FIG. 1 with the pressure-transmitting medium, the containment and the constituents all present in a stabilized geometry and transferred as such to a graphite pressure die in which simultaneous heat and pressure are applied thereto; and FIG. 3 represents a vertical sectional view through one embodiment of the composite that can be produced by the practice of this invention; in particular it represents the composite structure produced from the constituents disposed in the arrangement shown in FIGS. 1 and 2.

MANNER AND PROCESS OF MAKING AND USING THE INVENTION

Referring now more particularly to the drawings and the following description, the reader may envision in FIG. 1 that in accordance with this invention a process for preparing a composite structure is carried out by placing a quantity of fine, clean CBN crystals 10 and a mixture 12 of ceramic particles together with a powdered source of aluminum atoms within a suitable metal container 14. The mass of CBN powder should contain at least 70% by volume CBN. Container 14, as shown, consists of two interfitting cups 15, 16. Outer cup 15 is of refractory metal, such as molybdenum, for containment and inner cup 16, a lining for cup 15, is of a metal (e.g. zirconium) having gettering capabilities.

After the multi-component substrate precursor material 12 has been placed on top of the mass of fine CBN crystals 10, initial containment may be completed by enclosing container 14 and the contents thereof with an inverted cup 18 of refractory metal, which may be molybdenum, for example. In those instances in which substrate precursor 12 is in the form of a consolidated, close-fitting plug, cup 18 need not be used. This assembly is packed in a mass of very fine particles 20 (preferably in the size range from about 0.5 microns to about 20 microns) of a pressure transmitting medium (preferably hexagonal boron nitride) in a pressure mold 21 which comprises ring 22 and pistons 23, 24. The mold components are preferably made of tool steel. The contents of pressure mold 21 is subjected to pressures of greater than about 20,000 psi, preferably about 100,000 psi, at room temperature (about 68°–72° F.) to stabilize the geometry thereof.

The powdered source of aluminum atoms may be aluminum, per se, a preferred alloy of aluminum or aluminum plus a separate quantity of an aluminum alloy. Manifestly, the molten aluminum-base metal, which is intended to enter the mass of CBN and cement the particles together, should be chemically compatible with CBN in that it will wet and bond thereto, but not react extensively therewith. It is preferred that the CBN crystals be significantly less than 20 microns in largest dimension, although the range of particle sizes may, for sound CBN crystals, extend even higher.

The nature of the hexagonal boron nitride is such that the fine particles will slip over each other and readjust in an approximation of a hydrostatic action in response to the uniaxially applied pressure to exert pressure over the entire surface of the assembly. It is assumed that the applied pressure is transmitted substantially undiminished to the assembly.

The make-up of the multi-component precursor for the substrate will employ ceramic particles in the 1–100μ range and aluminum-atom yielding medium in the form of particles also in the 1–100μ range. These materials, properly mixed, may enter this process either as a consolidated mass or as a mixed powder.

When the geometry of the contents of pressure mold 21 has been stabilized by the pressure application described, it is transferred as a packed mass from steel die or mold 21 to an identical diameter graphite mold 30 shown in FIG. 2. Graphite mold 30 comprises ring 31, pistons 32, 33, and a thermocouple 34, which enables monitoring of the temperature prevailing in the dimensionally-stabilized assembly disposed between pistons 32, 33. The consolidated assembly including container 14, CBN crystals 10, the multi-component substrate precursor material 12, inverted cup 18, and pressure transmitting medium 20 is then simultaneously subjected (in a suitable furnace, not shown) to elevated pressure, preferably about 10,000–12,000 pounds per square inch between pistons 32, 33 and to a temperature in the range of from about 1200° C. to about 1400° C. for from about five to eight minutes. After the heater is shut off, the die is kept under pressure until it has cooled significantly below the melting temperature of the aluminum atom source. Thereafter, the assembly is removed.

The heating-pressurizing step is conducted in an atmosphere of nitrogen, hydrogen or an inert gas. During the period of time in which this step is conducted, the powdered metal source of aluminum atoms is melted, raised to a temperature at which it will satisfactorily wet CBN and squeezed from mixture 12 so that it can infiltrate the interspaces of CBN mass 10. Assuming the assembly does not leak, the rest of the powdered source of aluminum atoms remains in layer 12 to cover the ceramic particles and function as the cementing medium therefor. Among these ceramic materials suitable for use in this invention and able to employ aluminum or aluminum alloys as the cementing medium to form a strong, hard composition are silicon carbide; silicon nitride; the carbides, nitrides and borides of titanium, hafnium, zirconium, vanadium, niobium, tantalum, molybdenum and tungsten, and mixtures of the foregoing. Preferred ceramic materials are titanium diboride, tungsten carbide (more expensive and not as stable as titanium diboride), silicon nitride and silicon carbide.

Although eventually the heat and pressure must be simultaneously applied to container 14 and its contents, it may be of advantage, depending upon the source of aluminum employed, to apply heat before the application of pressure or to apply pressure before the initiation of the heating operation.

After completion of the simultaneous heat/pressure operation, the assembly (i.e. container 14 and its contents) is removed from the system, cleaned and a composite body is recovered. For the arrangement of materials described herein, by way of example, such a composite body is shown in FIG. 3. Similarly, an article useful as a blank for the operation of a wire drawing die can be prepared using the appropriate arrangement of materials described in aforementioned Ser. No. 217,271.

The composite structure shown in FIG. 3 comprises a mass 40 of cemented CBN, which mass is affixed to the stiff support material constituting substrate 41. Substrate 41 consists essentially of ceramic particles together with the cementing medium therefor, which cementing medium comprises either aluminum containing dissolved material derived from the ceramic constituent and/or an aluminum intermetallic depending on the starting source of aluminum atoms.

Practice of the aspect of this invention productive of the CBN/substrate composite has required the development of new substrate compositions; namely, compositions in which ceramic particles are cemented, i.e. bonded, together by a medium very high in aluminum atom content.

The following examples set forth experiments illustrating the results obtained in the practice of the invention as described herein; in an analogous process using other than a source of aluminum, and in an analogous process using diamond crystals in place of CBN. Abbreviations in the examples are explained as follows: weight percent (w/o); volume percent (v/o); pounds per square inch (psi); thousand pounds per square inch (kpsi); surface feet per minute (SFPM); micrometer ($\mu$); hexagonal boron nitride (HBN); milligram (mg); Rockwell (Rc); 1/1000 inch (mil). Where abbreviations used for the elements are set forth, standard designations are employed.

EXAMPLE 1

About 150 mg of jet milled CBN powder (4–8$\mu$ size) was packed in a zirconium cup with an additional zirconium strip inserted around the edge of the cup. A mixture of 200 mesh silicon carbide powder (60 w/o) and 100 mesh aluminum powder (40 w/o; ~44 v/o) weighing 385 mg was packed directly on top of the CBN powder. A hot pressed HBN disc tightly fitting in the cup was inserted to cover the packed powder. The entire assembly was then packed with HBN powder in a cemented carbide-lined steel die and the mass was pressed up to 100,000 psi. The pressed (i.e. stabilized) mass was then transferred into a graphite die for hot pressing. The hot pressing conditions were 6 minutes under 8,000 psi at 1300° C. in a nitrogen atmosphere. It took 4 minutes for the induction heater to bring the die temperature up to the process temperature, and the die was kept under pressure at the end of the pressing cycle until the die was cooled sufficiently below the melting temperature of the binder.

The CBN layer of the recovered sample was thoroughly infiltrated with the aluminum-base binder metal and remained bonded strongly to the aluminum-silicon carbide composite substrate.

EXAMPLE 2

Two samples were processed simultaneously in this example. A first zirconium can was packed with 150 mg of the same CBN powder as in Example 1, while a second zirconium can was packed with 300 mg of 325/400 mesh CBN powder. Both cans were then filled with 50 w/o silicon nitride (−325 mesh) and 50 w/o aluminum (100 mesh) as a mixture. Both cans were processed for hot pressing according to the steps set forth in Example 1.

Both the fine CBN powder as well as the more coarse CBN samples were completely infiltrated by the aluminum-base binder and each formed an integral body of CBN bonded on the aluminum-bonded silicon nitride substrate.

EXAMPLE 3

In this example, a mixture of 85 w/o of silicon carbide and 15 w/o (~17 v/o) aluminum was evaluated as the substrate composition. The same CBN powder as the one in Example 1 was also used for this case and the same steps were conducted as in Example 1. The result showed no sign of metal infiltration and the CBN layer remained powdery, illustrating that the aluminum atom-yielding medium was present in too small an amount.

EXAMPLE 4

A jet milled CBN powder of 4–8$\mu$ size was placed in a molybdenum can having a zirconium liner in contact with a substrate material comprising a mixture of 70 w/o of $TiB_2$, 25 w/o of Al, and 5 w/o of $NiAl_3$. The substrate material had previously been pressed in a cylindrical die under 12,000 psi to form a pill-shaped body.

The open end of the molybdenum can was then covered with another molybdenum can. The two molybdenum cans were not fastened to each other but could freely slide with respect to each other.

The cell assembled in this way was packed in a fine grain size HBN powder in a steel die and pressed to about 95 kpsi at room temperature (~68°–72° F.) to stabilize the geometry. The HBN packed cell was then inserted into a graphite die and simultaneously pressed and heated (at 12 kpsi and at 1360° C.) for about 6 minutes. Infiltration of the CBN mass by binder material from the substrate was excellent and a very good composite was formed with the CBN layer cemented to the $TiB_2$ substrate with its aluminum-base cementing medium.

EXAMPLE 5

A quantity of mixed grain size (80 w/o of 4–8$\mu$ and 20 w/o of −2$\mu$) CBN powder was placed in a zirconium-lined molybdenum can in contact with a pressed pill of substrate material comprising a mixture of 70 w/o of $TiB_2$, 25 w/o of Al, and 5 w/o of $NiAl_3$, the pill being prepared as in Example 4.

The open end of the first molybdenum can was then covered with a second (i.e. inverted) molybdenum can. The two molybdenum cans were not attached to each other, but could freely slide with respect to each other.

The cell assembled in this way was packed in a fine grain size HBN powder in a die and pressed to about 95 kpsi at room temperature to stabilize the geometry. The stabilized assembly packed in HBN was then inserted into a graphite die and simultaneously pressed and heated (at 12 kpsi and at 1360° C.) for about 6 minutes. Infiltration of the CBN mass by aluminum-base binder material from the substrate was again excellent, as in Example 4, and a very good compact was also formed with the CBN layer cemented on the $TiB_2$ substrate.

EXAMPLE 6

About 150 mg of CBN powder with an average particle size of about 7$\mu$ was packed into a Mo cup having a zirconium liner. A cemented tungsten carbide disc (87 w/o WC and 13 w/o Co) of 125 mil thickness was placed on top of the CBN powder. The cup assembly was then packed in HBN powder and the whole charge was pressed to about 100 kpsi. The pressed assembly was loaded into a graphite mold and heated to 1350° C.

The assembly was kept at this temperature for 8 minutes. A constant pressure of 10 kpsi was maintained throughout the heating and cooling cycle until the mold had cooled sufficiently. Since the cemented carbide disc effectively sealed the assembly, no inverted Mo cup was used.

The final compact showed that the cobalt binder from the substrate cemented carbide had infiltrated into the CBN powder. However, the resulting compact did not possess adequate strength, because cobalt did not bond strongly to the CBN.

EXAMPLE 7

400 mg of Grade 45 (30-60μ) diamond powder was packed at the bottom of a zirconium cup, and a mixture of 50 w/o tungsten carbide (average 5μ), 32.4 w/o silver, 12.5 w/o copper, and 5 w/o titanium was placed on top of the diamond powder to fill the cup. The can was then processed through the same procedures as in Example 1. However, the sample was heated to the hot pressing temperature (1300° C.) before the pressure was applied to ensure proper alloying of the infiltrant.

The diamond layer of the recovered sample was not infiltrated by the metallic medium in the tungsten carbide/metal mixture.

EXAMPLE 8

The coarser diamond powder (140/170 mesh) than the powder used for Example 7 was used in this example to evaluate the effect of diamond particle size on the infiltration process. In addition, a second assembly using diamond (140/170 mesh) and 10 w/o zirconium powder as a mixture in place of pure diamond was also processed simultaneously with the first can. Other process steps were the same as in Example 7.

The first sample containing diamond alone was infiltrated with metallic binder from the substrate, but diamond particles in the infiltrated layer pulled out rather easily during polishing, indicating that the diamond-to-metal bond strength in the diamond layer was not good. The second sample containing zirconium in the diamond layer was not infiltrated at all by the alloy from the substrate powder.

EXAMPLE 9

Grade 45 diamond powder (30-60μ) was used in this example in two assemblies. Powder mixture used for the source of binder for the diamond layer as well as the proposed substrate was 60 w/o TiC (approx. 2μ size) and 40 w/o Si for the first assembly and 60 w/o WC (approx. 5μ) and 40 w/o Si for the second assembly. The hot pressing temperature for this example was 1550° C. and the rest of the process steps were the same as in Example 7.

Silicon in the carbide layer did not infiltrate into the diamond layer in either case.

EXAMPLE 10

In this example, a mixture of 75 w/o of tungsten carbide with average particle size of 5μ and 25 w/o (65.7 v/o) of 100 U.S. mesh size aluminum was evaluated as the multi-component substrate precursor composition. The CBN powder and other process steps were the same as in Example 1. The results were that the CBN layer was infiltrated thoroughly, but the excess aluminum in the substrate caused severe cracking along the CBN layer-substrate interface.

EXAMPLE 11

Example 10 was repeated with a mixture of 85 w/o tungsten carbide and 15 w/o (50.4 v/o) aluminum as the multi-component substrate precursor composition. Again the CBN layer was infiltrated thoroughly, but this time this bonded layer was securely bonded to the aluminum-bonded tungsten carbide substrate body.

From the foregoing examples, it may be understood that a mass of metal-bonded CBN and a metal-bonded substrate can be simultaneously prepared with the CBN mass affixed to the substrate by a process in which molten aluminum-base material is caused to leave the substrate precursor and enter the particulate CBN to effect the bonding thereof. Various multi-component substrate precursor materials have been mentioned hereinabove as being suitable in combination, preferred ceramic components include titanium diboride, tungsten carbide, silicon nitride and silicon carbide, while suitable binders include aluminum and very high aluminum content (i.e. at least about 85 w/o) aluminum alloys. A preferred aluminum alloy contains aluminum accompanied by a strengthening element such as nickel.

It will be obvious to those skilled in the art that various changes may be made without departing from the scope of the invention as disclosed herein in its best mode and the invention is not to be considered limited to what is shown in the drawings and described in the specification.

What we claim as new and desire to secure by Letters Patent of the United States is:

1. In a process for cementing a quantity of cubic boron nitride particles together and bonding the cemented cubic boron nitride particles to a substrate to form a composite abrasive article wherein an assembly comprising a volume of said cubic boron nitride particles, substrate precursor material, an aluminum atom-yielding medium and containment means therefor is provided in a stabilized geometry and said assembly of stabilized geometry is hot-pressed by the simultaneous application thereto of heat and pressure, said hot-pressing being at a temperature substantially in excess of the melting point of said aluminum atom-yielding medium and at a pressure sufficiently high to cause molten aluminum atom-yielding medium to infiltrate the interstices between said cubic boron nitride particles, the improvement comprising:
  (a) deriving said substrate and the aluminum atom-yielding medium for said cubic boron nitride particles from a single multi-component source, said multi-component source comprising a mixture of ceramic particles and particles of said aluminum atom-yielding medium, the latter being present in a quantity between about 30 and 60 percent of the volume of the completed composite abrasive article.

2. The improvement as defined in claim 1, wherein the temperature and pressure simultaneously employed have values below the cubic boron nitride stable region of the phase diagram of boron nitride.

3. The improvement as defined in claim 1, wherein the cubic boron nitride particles are placed in an assembly as a layer adjacent the multi-component source.

4. The improvement as defined in claim 1, wherein the assembly includes as at least part of the containment means a molybdenum cup with a zirconium lining.

5. The improvement as defined in claim 1, wherein the components of the multi-component source are consolidated into a pressed body.

6. The improvement as defined in claim 1, wherein the hot pressing employs a temperature above 1200° C. and a pressure of at least about 2,000 pounds per square inch for at least about five minutes.

7. The improvement as defined in claim 1, wherein the ceramic particles are selected from the group consisting of silicon carbide; silicon nitride; the carbides, nitrides and borides of titanium, hafnium, zirconium, vanadium, niobium, tantalum, molybdenum and tungsten, and mixtures thereof.

8. The improvement as defined in claim 7, wherein the ceramic particles are selected from the group consisting of titanium diboride, tungsten carbide, silicon nitride and silicon carbide.

9. In a composite article consisting of a mass of metal-bonded cubic boron nitride crystals directly bonded to a body of metal-bonded ceramic particles, the improvement wherein the bonding medium for said cubic boron nitride crystals and the bonding medium for said ceramic particles have substantially the same content of aluminum, said content being at least about 85 percent by weight of the weight of bonding medium.

10. The composite abrasive article of claim 9, wherein the ceramic particles are selected from the group consisting of silicon carbide; silicon nitride; the carbides, nitrides and borides of titanium, hafnium, zirconium, vanadium, niobium, tantalum, molybdenum and tungsten, and mixtures thereof.

11. The composite abrasive article of claim 10 wherein the ceramic particles are selected from the group consisting of titanium diboride, tungsten carbide, silicon nitride and silicon carbide.

12. The composite abrasive article of claim 11, wherein the ceramic particles are of titanium diboride.

13. The composite abrasive article of claim 11, wherein the ceramic particles are of tungsten carbide.

14. The composite abrasive article of claim 11, wherein the ceramic particles are of silicon nitride.

15. The composite abrasive article of claim 11, wherein the ceramic particles are of silicon carbide.

16. The composite abrasive article of claim 9, wherein the mass of metal-bonded cubic boron nitride crystals is in the form of a layer and the metal-bonded ceramic particles are in the form of substrate therefor.

17. The composite abrasive article of claim 9, wherein the aluminum-base bonding medium for the ceramic particles is present in a concentration in the range of from about 30 to about 40 percent of the volume of the body of metal-bonded ceramic particles.

18. A composition of matter consisting essentially of metal-bonded ceramic particles wherein the ceramic is selected from the group consisting of silicon carbide; silicon nitride; titanium diboride; the carbides, nitrides and borides of hafnium, zirconium, vanadium, niobium, tantalum, molybdenum and tungsten, and mixtures thereof and the bonding medium has an aluminum atom content of at least about 85 percent by weight.

19. A composition of matter as recited in claim 18, wherein the ceramic is selected from the group consisting of titanium diboride, silicon nitride, silicon carbide and tungsten carbide.

20. The composition of matter recited in claim 18, wherein the aluminum-base bonding medium is present in a concentration in the range of from about 30 to about 50 volume percent.

21. The composition of matter recited in claim 18, wherein the aluminum-base bonding medium is present in a concentration in the range of from about 30 to about 40 volume percent.

* * * * *